May 15, 1928.
H. E. BLOOD
1,669,924
TRANSMISSION LOCK
Filed Nov. 27, 1925
2 Sheets-Sheet 1
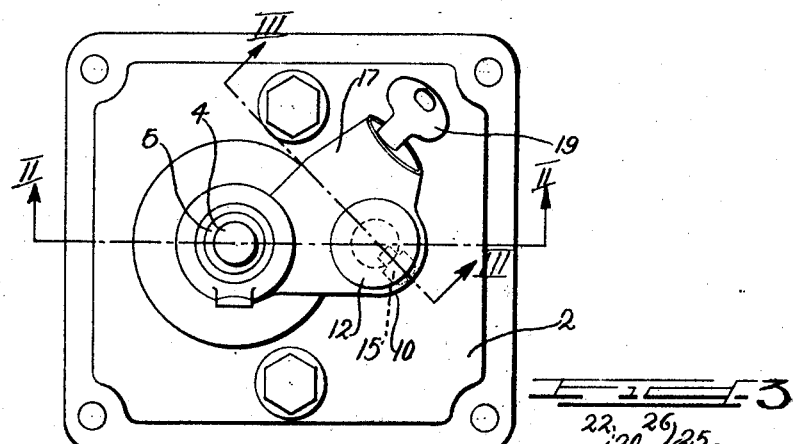
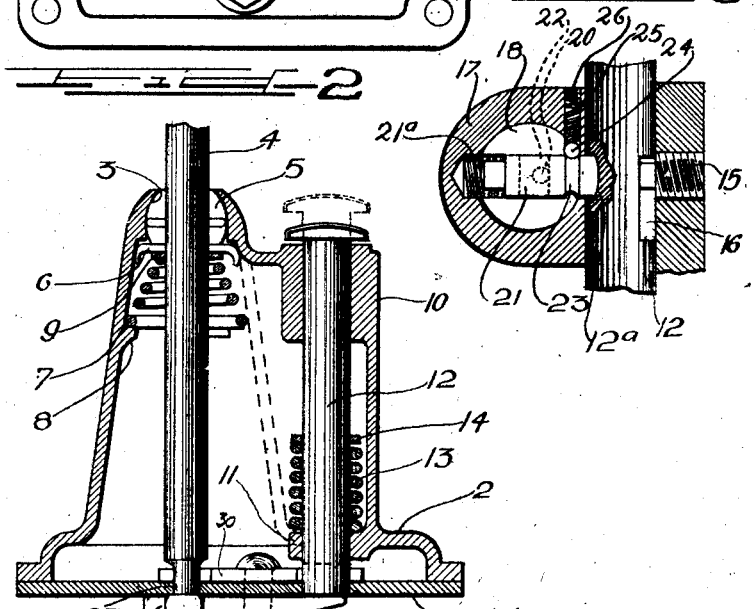
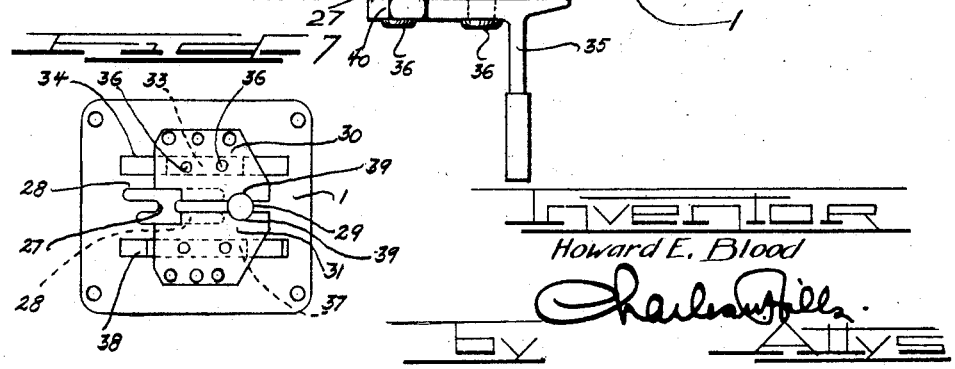
INVENTOR
Howard E. Blood

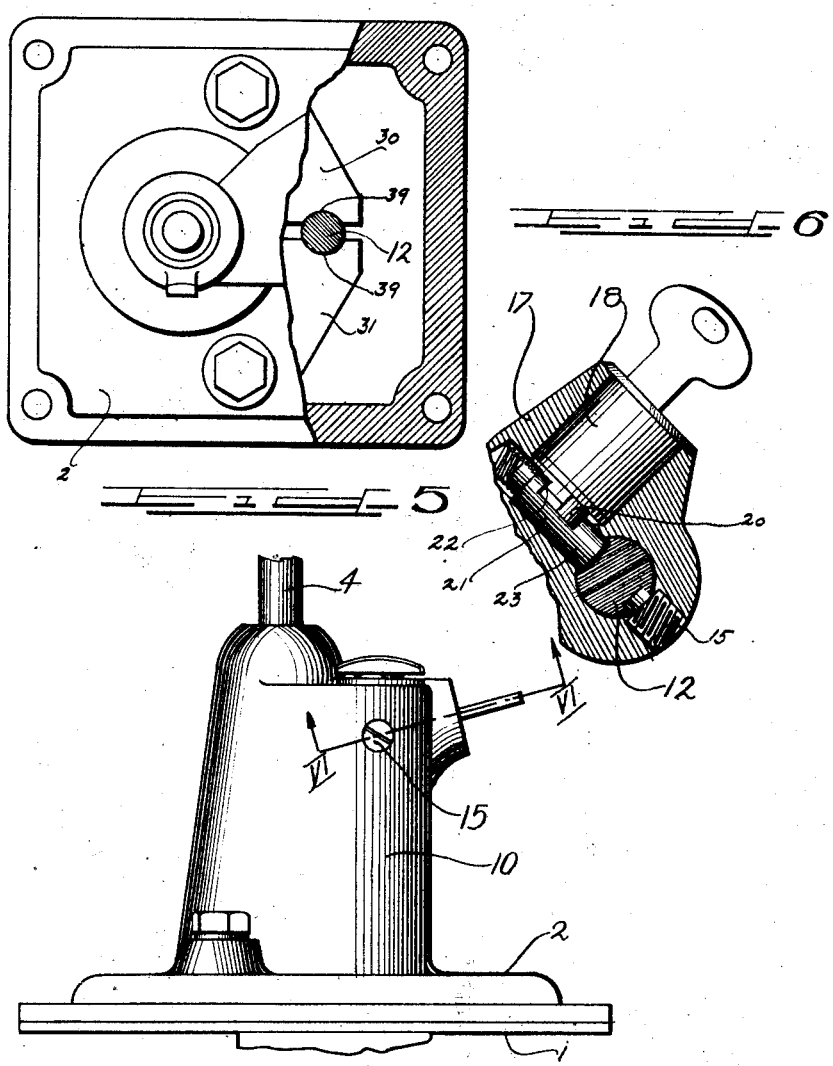

Patented May 15, 1928.

1,669,924

UNITED STATES PATENT OFFICE.

HOWARD E. BLOOD, OF DETROIT, MICHIGAN, ASSIGNOR, BY MESNE ASSIGNMENTS, TO JOHNSON AUTOMOBILE LOCK COMPANY, OF ST. LOUIS, MISSOURI, A CORPORATION OF MISSOURI.

TRANSMISSION LOCK.

Application filed November 27, 1925. Serial No. 71,512.

This invention relates to transmission locks in general and more particularly to such locks as are adapted to prevent operation of the gear shifting means when in locked position. It is accordingly an object of this invention to provide a transmission locking means which will efficiently hold the gear shifting means in a predetermined inoperative position against actuation from said position to shift the gears.

It is further an important object of this invention to provide a push down plunger in combination with a stationary transmission housing and cover.

Other and further important objects of this invention will be apparent from the disclosures in the specification and the accompanying drawings.

The invention (in a preferred form) is illustrated in the drawings and hereinafter more fully described.

On the drawings:

Figure 1 represents a plan view with parts omitted of a device embodying this invention.

Figure 2 is a fragmentary vertical section with parts omitted taken at the line II—II of Figure 1.

Figure 3 is an enlarged fragmentary section with parts omitted taken at the line III—III of Figure 1.

Figure 4 is a fragmentary view of the device as shown in Figure 1 showing a portion of the cover removed.

Figure 5 is a fragmentary side view with parts omitted of the device as viewed from the lower right hand corner of Figure 1.

Figure 6 is a fragmentary sectional view with parts omitted taken at the line VI—VI of Figure 5.

Figure 7 is a reduced plan view of the device of Figure 1 with parts omitted.

As shown on the drawings:

A plate 1 is secured between the upper edge of a transmission housing (not shown) and a transmission cover 2. The transmission cover 2 is provided with an integral upwardly extending dome portion having a bearing 3 therein at the upper end thereof for universally supporting a gear shift lever 4. A ball member 5 rigidly secured on the lever 4 fits within the bearing 3 for universal movement therein and rests upon the downwardly dished member 6 which is apertured to receive said lever. A compression spring 7 resting upon a shoulder 8 within the dome shaped portion of the cover 2 surrounds the lever 4 and abuts the member 6 upwardly through a washer 9 also surrounding said lever. The cover 2 is also provided with an upwardly extending integral semi-cylindrical portion 10 which merges with the dome shaped portion at the sides thereof. The portion 10 is recessed within to provide a ledge 11. The top of the portion 10 and the ledge 11 are each apertured to receive therethrough a vertical plunger or bolt 12 having a flat round head thereon. Surrounding the plunger 12 and resting upon the top of the ledge 11 is a compression spring 13 which abuts a pin 14 extending through said plunger and acts to hold the latter in the upward or dotted line position shown in Figure 2. As shown in Figure 3, a stop 15 threaded into the side of the portion 10 and extending into a vertically extending recess 16 in the plunger 12 acts to limit the vertical movement of the latter. Integral with the portion 10 of the cover 2 is an off-set portion 17 for containing an inwardly extending lock barrel 18. The lock barrel 18 is adapted to be rotated by a suitable key 19 and is provided with an inwardly extending cylindrical pin 20 eccentrically positioned with respect to the axis of said barrel. The plunger 12 is provided with a locking recess 12$^a$ which when said plunger is in downward position is adapted to receive a plunger 21 diametrically positioned in a suitable recess in the portion 17 at the inner end of the barrel 18 and normally pressed outwardly by a spring 21$^a$. The plunger 21 is provided with an upwardly extending slot 22 for receiving the pin 20 therein and an annular groove 23 for receiving therein a ball 24 which is pressed inwardly by a spring 25. The spring 25 is held in an inwardly extending recess in the portion 17 by a threaded closure member 26. The groove 23 is positioned along the axis of the plunger 21 to receive the ball 24 when said plunger is in locking position in the recess 12$^a$. The plate 1 is provided with a transverse slot 27 merging with a pair of oppositely positioned longitudinal slots 28 (Figure 7). The lower end of the lever 4 extends through the slot 27 and remains therein when the gears are in neutral position. The plate 1 is apertured as at 29 to receive the lower end of the bolt 12 when the latter is pressed downward to locking position. On either side of the aperture 29 are similar plates 30 and 31. The plate 30 has secured therebeneath a longitudinal guide bar 33 which is adapted to slide in a longitudinal slot 34 in the plate 1. A left-hand shifting fork 35 is secured beneath the plate 30 and the slidable guide bar 33 by means of a pair of longitudinally spaced rivets 36. Another gear-shifting fork not shown but similar to the fork 35 is secured to the plate 31 beneath a guide bar 37 similar to the guide bar 33 and slidable in a slot 38 similar to the slot 34. Semi-circular recesses 39 in the plates 30 and 31 align with the aperture 29 when the gear-shifting forks are in neutral position. The gear-shifting forks are each provided with an inwardly open recess 40 near one end as shown in Figure 2. The recesses 40 are adapted to receive the lower end of the lever 4 when the latter is shifted transversely to bring the same out of the slot 27 into alignment with either longitudinal slot 28 for shifting the gears. It will be apparent however that while the bolt 12 is in locked position engaging in the recesses 39 and aperture 29 that the plates 30 and 31 will be locked, holding the gear shifting forks against movement. It will be obvious that the above described device provides a simple and efficient means for locking the transmission of an automobile and that said means may be simply and economically manufactured and easily operated.

The operation of the device will be obvious from the above description.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. The combination with a transmission housing and cover therefor, of a slidable locking member in said cover, a slotted member rigidly secured between said cover and said housing, gear shifting means in said housing, and means associated with said gear shifting means extending upwardly through said slotted member for sliding movement thereon, said associated means being constructed to receive said locking member when said gear shifting means is in a predetermined position for locking the latter against movement.

2. The combination with a transmission housing and cover therefor, of a slidable locking member, a slotted member secured between said housing and cover, and gear shifting means including a pair of plate members separately operable for selectively shifting said gears, said plate members having recesses therein for engaging said locking member at a predetermined position of said shifting means for locking the latter against movement.

3. The combination with a transmission housing, a cover for said housing, gear shift means in said housing, a lever for actuating said gear shifting means, a slidable lock bolt operable independent of said lever to engage said gear shifting means in a predetermined position, means slidable in said housing, for automatically locking said bolt when actuated to engage said gear shifting means, and means operable to prevent retraction of said slidable means when in locking engagement with said bolt.

4. In a transmission lock, a housing, a cover for said housing, a slotted plate between said cover and housing, a pair of gear shift members slidably supported upon said plate, a gear shift lever mounted in said cover for engaging said members and extending through said slotted plate, said cover having an offset portion, a slidable locking bolt in said offset portion for engaging between said members when the same are in a predetermined position, and means for locking said bolt in operative position.

In testimony whereof I have hereunto subscribed my name.

HOWARD E. BLOOD.